US012645254B2

(12) United States Patent
Deng et al.

(10) Patent No.: US 12,645,254 B2
(45) Date of Patent: Jun. 2, 2026

(54) METHOD FOR DETECTING FOLDING ANGLE OF FOLDABLE SCREEN, TOUCH CHIP, AND TOUCH PANEL

(71) Applicant: SHENZHEN GOODIX TECHNOLOGY CO., LTD., Shenzhen (CN)

(72) Inventors: Qinghuang Deng, Shenzhen (CN); Jun Fang, Shenzhen (CN); Guang Wu, Shenzhen (CN)

(73) Assignee: Shenzhen Goodix Technology Co., Ltd. (CN)

( * ) Notice: Subject to any disclaimer, the term of this patent is extended or adjusted under 35 U.S.C. 154(b) by 267 days.

(21) Appl. No.: 18/502,201

(22) Filed: Nov. 6, 2023

(65) Prior Publication Data

US 2024/0152180 A1     May 9, 2024

(30) Foreign Application Priority Data

Nov. 8, 2022     (CN) ......................... 202211389275.X

(51) Int. Cl.
*G06F 1/16* (2006.01)
*G01B 7/30* (2006.01)
*G06F 3/041* (2006.01)

(52) U.S. Cl.
CPC ............. *G06F 1/1616* (2013.01); *G01B 7/30* (2013.01); *G06F 3/0412* (2013.01); *G06F 3/04164* (2019.05); *G06F 2203/04102* (2013.01)

(58) Field of Classification Search
None
See application file for complete search history.

(56) References Cited

U.S. PATENT DOCUMENTS

| | | | |
|---|---|---|---|
| 11,573,663 B1* | 2/2023 | Yun ...................... | G06F 3/0446 |
| 2018/0088633 A1 | 3/2018 | Whitman et al. | |
| 2019/0042042 A1 | 2/2019 | Hei et al. | |

FOREIGN PATENT DOCUMENTS

| | | |
|---|---|---|
| CN | 107144216 A | 9/2017 |
| CN | 108874224 A | 11/2018 |

(Continued)

OTHER PUBLICATIONS

European Search Report of patent family EP23208557.1 issued on Mar. 13, 2024.

*Primary Examiner* — Brian M Butcher
(74) *Attorney, Agent, or Firm* — Emerson, Thomson & Bennett, LLC; Roger D. Emerson; Peter R. Detorre

(57) ABSTRACT

The present disclosure provides a method for detecting a folding angle of a foldable screen, a touch chip, a touch panel, and an electronic device, thereby effectively detecting a folding angle of a foldable screen of the electronic device. The method includes: acquiring detection data of a particular detection channel in a touch panel, where the touch panel includes a bending region extending along a first direction and a non-bending region distributed on both sides of the bending region along a second direction, the second direction is perpendicular to the first direction, and the particular detection channel is a first detection channel that is closest to the bending region or is located within the bending region among a plurality of first detection channels parallel to the first direction; and determining the folding angle of the foldable screen according to the detection data of the particular detection channel.

16 Claims, 6 Drawing Sheets

(56)                          References Cited

FOREIGN PATENT DOCUMENTS

| CN | 110839096 | A | 2/2020 |
| CN | 112729102 | A | 4/2021 |
| CN | 113296636 | A | 8/2021 |
| CN | 115268702 | A | 11/2022 |
| WO | 2021139767 | A1 | 7/2021 |

* cited by examiner

<u>100</u>

(a)

(b)

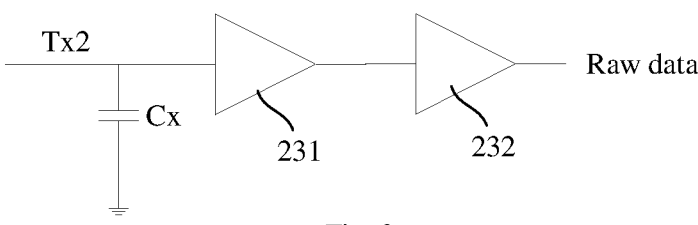
Fig. 3
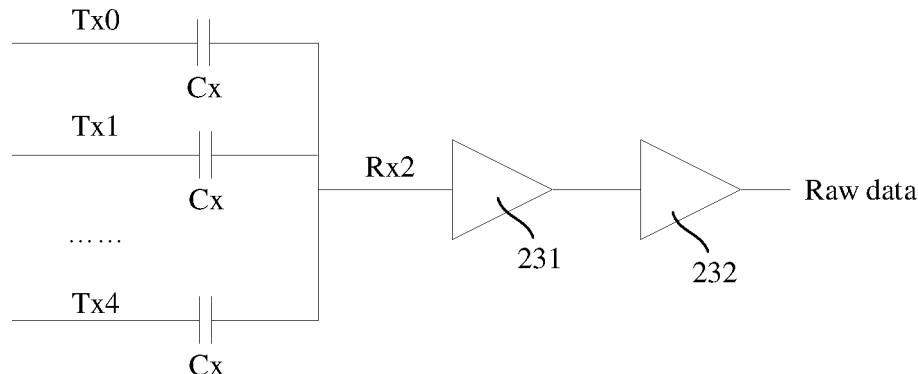
Fig. 4
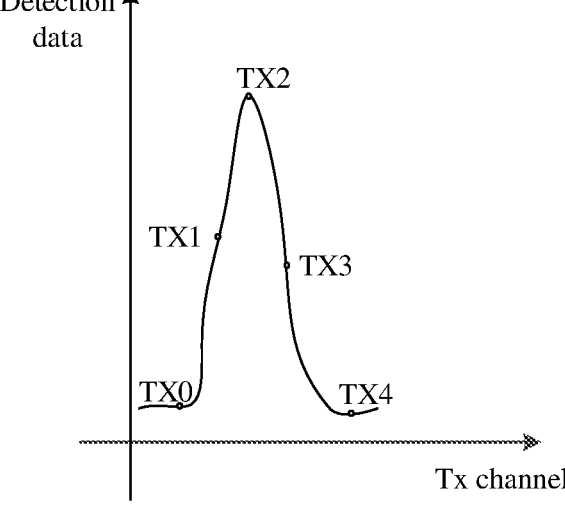
Fig. 5
Fig. 6

301

Acquiring raw data of each Tx channel during self-capacitance detection

302

Computing D(i)=basic data-raw data

303

Computing DD(1)=D(2)-D(1)

304

Computing a folding angle func1 (DD(1))

305

Computing DD(2)=D(3)-D(2)

306

Computing a folding angle func2 (DD(2))

300

Touch chip

Acquisition module   310

Processing module   320

METHOD FOR DETECTING FOLDING ANGLE OF FOLDABLE SCREEN, TOUCH CHIP, AND TOUCH PANEL

CROSS REFERENCE TO RELATED APPLICATIONS

The present disclosure claims priority to Chinese Patent Application No. 202211389275.X, filed with the Chinese patent Office on Nov. 8, 2022 and entitled "METHOD FOR DETECTING FOLDING ANGLE OF FOLDABLE SCREEN, TOUCH CHIP, AND TOUCH PANEL", the entire contents of which are incorporated herein by reference.

TECHNICAL FIELD

Embodiments of the present disclosure relate to the field of optical sensors, and more specifically relate to a method for detecting a folding angle of a foldable screen, a touch chip, a touch panel, and an electronic device.

BACKGROUND

Regarding an electronic device such as a mobile phone with a flexible foldable screen, it is necessary to realize functions such as assisting in user interface (UI) and decapsulation and encapsulation detection through a rotating action. Therefore, how to detect a folding angle of a foldable screen of the electronic device has become a to-be-solved problem.

SUMMARY

Embodiments of the present disclosure provide a method for detecting a folding angle of a foldable screen, a touch chip, a touch panel, and an electronic device, thereby effectively detecting a folding angle of a foldable screen of the electronic device.

In a first aspect, a method for detecting a folding angle of a foldable screen is provided, including: acquiring detection data of a particular detection channel in a touch panel, where the touch panel includes a bending region extending along a first direction and a non-bending region distributed on both sides of the bending region along a second direction, the second direction is perpendicular to the first direction, and the particular detection channel is a first detection channel that is closest to the bending region or is located within the bending region among a plurality of first detection channels parallel to the first direction; and determining the folding angle of the foldable screen according to the detection data of the particular detection channel.

When the folding angle of the foldable screen changes, a distance between two non-bending regions changes, and a coupling capacitor may be formed between detection channels within the two non-bending regions, thereby affecting data outputted from the detection channels, and interfering with the detection process. Therefore, the folding angle of the foldable screen can be effectively determined according to the detection data of the detection channels. Further, because a large amount of signal is generated on a detection channel at a bending region of the foldable screen, the folding angle of the foldable screen can be determined using the detection data of the detection channel at the bending region, thereby improving accuracy of the folding angle detection.

In an implementation, the determining the folding angle of the foldable screen according to the detection data of the particular detection channel includes: determining the folding angle of the foldable screen according to the detection data of the particular detection channel and a function for representing a relationship between the detection data and the folding angle.

In an implementation, the determining the folding angle of the foldable screen according to the detection data of the particular detection channel and the function for representing the relationship between the detection data and the folding angle includes: differentiating the detection data of the particular detection channel and detection data of a first detection channel adjacent to the particular detection channel to obtain differential data of the particular detection channel; and determining the folding angle of the foldable screen according to the differential data of the particular detection channel and a function for representing a relationship between the differential data and the folding angle.

In an implementation, the differential data of the particular detection channel includes first differential data and second differential data, where the first differential data is differential data between the particular detection channel and an adjacent first detection channel located on one side of the particular detection channel, and the second differential data is differential data between an adjacent first detection channel located on the other side of the particular detection channel and the particular detection channel; and the determining the folding angle of the foldable screen according to the differential data of the particular detection channel and the function for representing the relationship between the differential data and the folding angle includes: determining a first folding angle according to the first differential data and a first function for representing a relationship between the first differential data and the folding angle; determining, in response to the first folding angle exceeding a first preset range, a second folding angle according to the second differential data and a second function for representing a relationship between the second differential data and the folding angle; and determining, in response to the second folding angle being located within a second preset range, the second folding angle as the folding angle of the foldable screen.

In an implementation, the method further includes: determining, in response to the first folding angle being located within the first preset range, the first folding angle as the folding angle of the foldable screen.

In an implementation, the detection data of the particular detection channel is determined according to a difference value between base data and raw data outputted from the particular detection channel, and the base data is raw data outputted from the particular detection channel when the folding angle is a preset angle. The detection data of the particular detection channel and detection data of a detection channel adjacent to the particular detection channel are differentiated to obtain differential data, and the folding angle is determined according to the differential data, thereby eliminating environmental interferences, and reducing influence of environmental factors on the detection process.

In an implementation, the preset angle is 180°. In this case, there is minimal influence between the detection channels of the two non-bending regions 220, and a detection signal outputted from the particular detection channel is more suitable as base data to improve sensitivity of the folding angle detection.

In an implementation, the detection data of the particular detection channel is a difference value between the base data and raw data outputted from the particular detection channel when a drive signal is inputted into the particular detection channel.

In an implementation, the detection data of the particular detection channel is determined according to the base data and a plurality of raw data outputted from the particular detection channel respectively when a drive signal is successively inputted into a plurality of second detection channels parallel to the second direction.

In an implementation, the detection data of the particular detection channel is a sum of a plurality of difference values between the base data and the plurality of raw data respectively.

In an implementation, the detection data of the particular detection channel is a difference value between the base data and raw data outputted from the particular detection channel when a drive signal is inputted into a plurality of second detection channels parallel to the second direction simultaneously.

In a second aspect, a touch chip is provided. The touch chip is configured to detect a folding angle of a foldable screen of an electronic device. The touch chip includes: an acquisition module configured to acquire detection data of a particular detection channel in a touch panel, where the touch panel includes a bending region extending along a first direction and a non-bending region distributed on both sides of the bending region along a second direction, the second direction is perpendicular to the first direction, and the particular detection channel is a first detection channel that is closest to the bending region or is located within the bending region among a plurality of first detection channels parallel to the first direction; and a processing module configured to determine the folding angle of the foldable screen according to the detection data of the particular detection channel.

In an implementation, the processing module is specifically configured to: determine the folding angle of the foldable screen according to the detection data of the particular detection channel and a function for representing a relationship between the detection data and the folding angle.

In an implementation, the processing module is specifically configured to: differentiate the detection data of the particular detection channel and detection data of a first detection channel adjacent to the particular detection channel to obtain differential data of the particular detection channel; and determine the folding angle of the foldable screen according to the differential data of the particular detection channel and a function for representing a relationship between the differential data and the folding angle.

In an implementation, the differential data of the particular detection channel includes first differential data and second differential data, where the first differential data is differential data between the particular detection channel and an adjacent first detection channel located on one side of the particular detection channel, and the second differential data is differential data between an adjacent first detection channel located on the other side of the particular detection channel and the particular detection channel; and the processing module is specifically configured to: determine a first folding angle according to the first differential data and a first function for representing a relationship between the first differential data and the folding angle; determine, in response to the first folding angle exceeding a first preset range, a second folding angle according to the second differential data and a second function for representing a relationship between the second differential data and the folding angle; and determine, in response to the second folding angle being located within a second preset range, the second folding angle as the folding angle of the foldable screen.

In an implementation, the processing module is further configured to: determine, in response to the first folding angle being located within the first preset range, the first folding angle as the folding angle of the foldable screen.

In an implementation, the detection data of the particular detection channel is determined according to a difference value between base data and raw data outputted from the particular detection channel, and the base data is raw data outputted from the particular detection channel when the folding angle is a preset angle.

In an implementation, the preset angle is 180°.

In an implementation, the detection data of the particular detection channel is a difference value between the base data and raw data outputted from the particular detection channel when a drive signal is inputted into the particular detection channel.

In an implementation, the detection data of the particular detection channel is determined according to the base data and a plurality of raw data outputted from the particular detection channel respectively when a drive signal is successively inputted into a plurality of second detection channels parallel to the second direction.

In an implementation, the detection data of the particular detection channel is a sum of a plurality of difference values between the base data and the plurality of raw data respectively.

In an implementation, the detection data of the particular detection channel is a difference value between the base data and raw data outputted from the particular detection channel when a drive signal is inputted into a plurality of second detection channels parallel to the second direction simultaneously.

In a third aspect, a touch panel is provided, where the touch panel includes: a plurality of first detection channels parallel to a first direction; a plurality of second detection channels parallel to a second direction, where the second direction is perpendicular to the first direction; and the touch chip according to the second aspect or any one possible implementation in the second aspect.

In a fourth aspect, an electronic device is provided, including: a foldable screen; and the touch chip according to the third aspect or any possible implementation in the third aspect.

BRIEF DESCRIPTION OF THE DRAWINGS

FIG. 3 is a schematic diagram of a principle of self-capacitance detection.

FIG. 4 is a schematic diagram of a principle of mutual capacitance detection.

FIG. 5 is a schematic diagram of a principle of cross detection.

FIG. 6 is a schematic diagram of change of detection data of a Tx channel with a position of the Tx channel during self-capacitance detection.

DETAILED DESCRIPTION OF EMBODIMENTS

Technical solutions of the present disclosure will be described below with reference to the drawings.

Generally, a folding angle of a foldable screen of an electronic device can be detected using a Hall device. However, when a user uses the electronic device with the foldable screen in a magnetic field environment, the magnetic field environment may cause interference or failure to a Hall sensor, thus affecting user experience. In addition, the Hall device further occupies internal space of the electronic device, and increases the costs.

Therefore, the present disclosure provides a solution for detecting a folding angle of a foldable screen, so as to solve a problem of how to effectively detect a folding angle of a foldable screen, which has advantages of high accuracy, is not easily influenced by an external environment, occupies no internal space of the electronic device, and will not cause additional costs.

Figure 1:
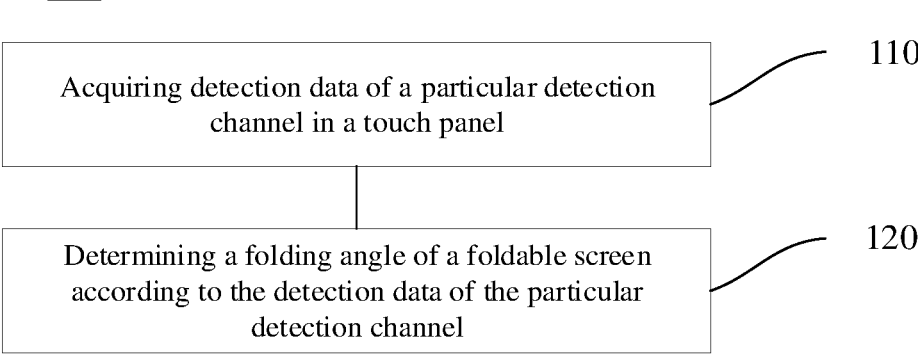
FIG. 1 is a schematic flowchart of a method for detecting a folding angle in an embodiment of the present disclosure.

FIG. 1 shows a method for detecting a folding angle of a foldable screen in an embodiment of the present disclosure. The method is executed by a touch chip of a touch panel of an electronic device, where the touch chip is also referred to as a touch controller or a touch panel integrated circuit (TPIC). The foldable screen may include, for example, the touch panel and a display panel, and generally, the display panel is located above the touch panel. As show in FIG. 1, the method 100 for detecting a folding angle includes some or all of the following steps:

Step 110: acquiring detection data of a particular detection channel in a touch panel.

Step 120: determining the folding angle of the foldable screen according to the detection data of the particular detection channel.

Figure 2:
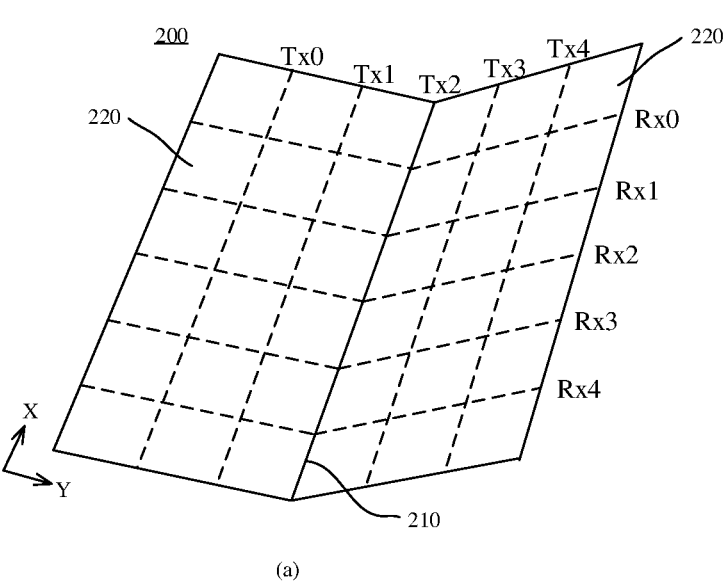
FIG. 2 is a schematic diagram of a touch panel.
Figure 2:
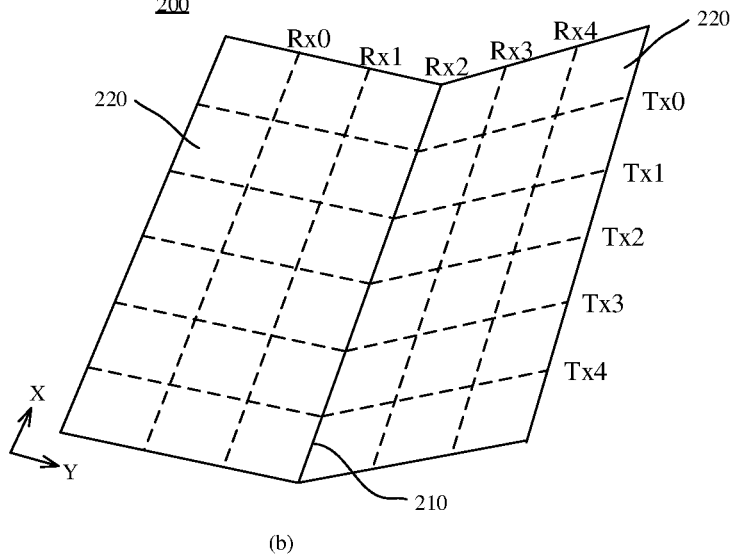

A touch panel 200 is shown in FIG. 2. The touch panel 200 includes a plurality of first detection channels, or referred to as first detection electrodes, parallel to a first direction X; and the touch panel 200 further includes a plurality of second detection channels, or referred to as second detection electrodes, parallel to a second direction Y. Optionally, the first detection channel is a transmission (Tx) channel, and the second detection channel is a sensing (Rx) channel; or, the second detection channel is a transmission (Tx) channel, and the first detection channel is a sensing (Rx) channel. For example, as shown in FIG. 2(*a*), the first detection channel is a Tx channel, and the second detection channel is a Rx channel. The touch panel 200 includes 5 first detection channels, namely Tx0, Tx1, Tx2, Tx3, and Tx4. The touch panel 200 further includes 5 second detection channels, namely Rx0, Rx1, Rx2, Rx3, and Rx4. For another example, as shown in FIG. 2(*b*), the second detection channel is a Tx channel, and the first detection channel is a Rx channel. The touch panel 200 includes 5 second detection channels, namely Tx0, Tx1, Tx2, Tx3, and Tx4. The touch panel 200 further includes 5 first detection channels, namely Rx0, Rx1, Rx2, Rx3, and Rx4. In a practical application, the touch panel 200 may have other number of first detection channels and other number of second detection channels.

As shown in FIG. 2, the touch panel 200 includes a bending region 210 extending along the first direction X, and a non-bending region 220 distributed on both sides of the bending region 210 along the second direction Y, where the second direction Y is perpendicular to the first direction X.

In the embodiment of the present disclosure, the particular detection channel is a first detection channel closest to the bending region 210 among the plurality of first detection channels parallel to the first direction X, such as Tx2 shown in FIG. 2(*a*), or is a first detection channel located within the bending region 210 among the plurality of first detection channels, such as Rx2 shown in FIG. 2(*b*). When the plurality of first detection channels satisfies the above conditions, one of them may be selected as the particular detection channel.

In an implementation, detection data of the particular detection channel may be raw data of the particular detection channel; or, detection data of the particular detection channel may be determined according to a difference value between base data and the raw data of the particular detection channel, so as to improve sensitivity of the folding angle detection. When the folding angle is a preset angle, the raw data of the particular detection channel is referred to as the base data, and is determined based on data outputted from the particular detection channel during code driving. The code driving refers to a process of inputting a drive signal into at least one detection channel in the touch panel 200. In the embodiment of the present disclosure, code driving may be performed by means of, for example, self-capacitance detection, mutual capacitance detection, or cross detection to obtain the raw data of the particular detection channel. In a code driving process, the particular detection channel will generate a corresponding sensing signal, from which data without any filtering can be obtained by signal extraction through a Programmable Gain Amplifier (PGA) circuit and analog-to-digital conversion through an analog to digital converter (ADC) circuit, where the data can be used as the raw data.

The preset angle may be set as, e.g., 180°. In this case, there is minimal influence between detection channels of two non-bending regions 220, and the raw data of the particular detection channel is more suitable as the base data to improve the sensitivity of the folding angle detection.

Taking self-capacitance detection, mutual capacitance detection, or cross detection as an example, how to determine the folding angle of the foldable screen based on the detection data of the particular detection channel is described in detail below.

In an implementation, in step 110, the raw data of the particular detection channel is self-capacitance data outputted from the particular detection channel during self-capacitance detection, i.e., the detection data of the particular detection channel is a difference value between the base data and raw data outputted from the particular detection channel when a drive signal is inputted into the particular detection channel. The particular detection channel is, for example, a Tx2 channel shown in FIG. 2(*a*). During self-capacitance detection, as shown in FIG. 2(*a*), code driving is performed simultaneously for a plurality of Tx channels, to generate corresponding sensing signals respectively. When the folding angle of the foldable screen changes, as shown in FIG. 3, self-capacitance Cx of the Tx2 channel, i.e., coupling capacitance Cx formed between the Tx2 channel and the ground, will change. After the sensing signal generated by the Tx2 channel passes through PGA 231 for signal amount extraction and ADC 232 for analog-to-digital conversion, raw data of the Tx2 channel can be obtained. The raw data reflects the change of the coupling capacitance Cx with the folding angle. According to a difference value between the base data and the raw data of the Tx2 channel, the folding angle of the foldable screen can be determined. The particular detection channel is, for example, a Rx2 channel and its adjacent Rx channel as shown in FIG. 2(b). During self-capacitance detection, as shown in FIG. 2(b), code driving is performed simultaneously for a plurality of Rx channels to generate corresponding sensing signals respectively. When the folding angle of the foldable screen changes, self-capacitance Cx of the Rx2 channel and its adjacent Rx channel changes. Raw data of the Rx2 channel and its adjacent Rx channel can be obtained by processing received sensing signals corresponding to self-capacitance Cx of the self-capacitance Cx of the Rx2 channel and its adjacent Rx channel, for example, by subjecting the sensing signals generated by the Rx2 channel and its adjacent Rx channel to PGA 231 for extracting the signal amount and ADC 232 for analog-to-digital conversion. The raw data reflects the changes in the coupling capacitance Cx with the folding angle, and the folding angle can be determined based on difference values between the base data and raw data of the Tx2 channel and its adjacent Rx channel. Further, after obtaining the difference values between the base data and raw data of the Tx2 channel and its adjacent Rx channel, a weighted average is performed on a plurality of difference values to determine the folding angle of the foldable screen. The particular detection channel includes a channel that is located in the middle of the foldable screen and a channel adjacent to the channel that located in the middle of the foldable screen. For example, the particular detection channels is provided as 6, 8 or 10 in number. The preset angle may be, for example, set to 180°. When the preset angle is 180°, the interaction between the detection channels of the two non-foldable regions 220 is minimized, and the raw data of the particular detection channel (the channel located in the middle of the foldable screen and its adjacent channels) may be used as the base data to improve the sensitivity of detecting the folding angle.

In another implementation, in step 110, the raw data of the particular detection channel is determined according to mutual capacitance data outputted from the particular detection channel during mutual capacitance detection, and the detection data of the particular detection channel is determined according to the base data and a plurality of raw data outputted from the particular detection channel respectively when a drive signal is successively inputted into the plurality of second detection channels. The particular detection channel is, for example, a Rx2 channel as shown in FIG. 2(b). During mutual capacitance detection, as shown in FIG. 2(b), code driving is successively performed for the plurality of Tx channels, where when code driving is performed for each Tx channel, a corresponding sensing signal will be generated in each of a plurality of Rx channels intersecting therewith. When the folding angle of the foldable screen changes, as shown in FIG. 4, coupling capacitance Cx formed between the plurality of Tx channels and the Rx2 channel, i.e., mutual capacitance Cx between the plurality of Tx channels and the Rx2 channel, will change. After the sensing signal generated by the Rx2 channel passes through the PGA 231 for signal amount extraction and the ADC 232 for analog-to-digital conversion, corresponding raw data successively outputted from the Rx2 channel when code driving is successively performed for the plurality of Tx channels can be obtained. These raw data are subtracted from the base data respectively, the resulting difference values are summed to obtain detection data of the Rx2 channel, and the folding angle of the foldable screen can be determined according to the detection data. For example, when code driving is successively performed for Tx0, Tx1, Tx2, Tx3, and Tx4, the Rx2 channel outputs 5 corresponding raw data respectively, and after the 5 raw data are subtracted from the base data respectively, 5 corresponding difference values are obtained. The 5 difference values are summed to obtain detection data of the Rx2 channel, and the folding angle of the foldable screen can be determined according to the detection data.

In still another implementation, in step 110, the raw data of the particular detection channel is data outputted from the particular detection channel during cross detection, and the detection data of the particular detection channel is a difference value between the base data and raw data outputted from the particular detection channel when a drive signal is inputted into the plurality of second detection channels simultaneously. The particular detection channel is, for example, a Rx2 channel shown in FIG. 2(b). During cross detection, as shown in FIG. 2(b), code driving is performed simultaneously for the plurality of Tx channels, so that the plurality of Rx channels generates corresponding sensing signals simultaneously. When the folding angle of the foldable screen changes, as shown in FIG. 5, coupling capacitance Cx formed between the Rx2 channel and each of the plurality of Tx channels will change. The sensing signal generated by the Rx2 channel passes through the PGA 231 for signal amount extraction and the ADC 232 for analog-to-digital conversion, and raw data of the Rx2 channel can be obtained when code driving is performed simultaneously for the plurality of Tx channels. The raw data reflects the change of the coupling capacitance Cx with the folding angle. According to a difference value between the base data and the raw data of the Rx2 channel, the folding angle of the foldable screen can be determined.

Each first detection channel parallel to the first direction X is tested to obtain a relationship between a position of the first detection channel and its detection data shown in FIG. 6, where the detection data of the particular detection channel has a largest value at the bending region 210. Taking the self-capacitance detection shown in FIG. 2(a) as an example, FIG. 6 shows change of detection data of each Tx channel with a position of the Tx channel. In a practical test, no matter whether self-capacitance detection, mutual capacitance detection, or cross detection is used, the change of the detection data of each Tx channel with the position of the Tx channel follows a law shown in FIG. 6. As can be seen from FIG. 6, the closer the detection channel is to the bending region 210, the larger the value of the detection data is, and the detection data of the Tx2 channel has a largest value at the bending region 210.

Figure 7:
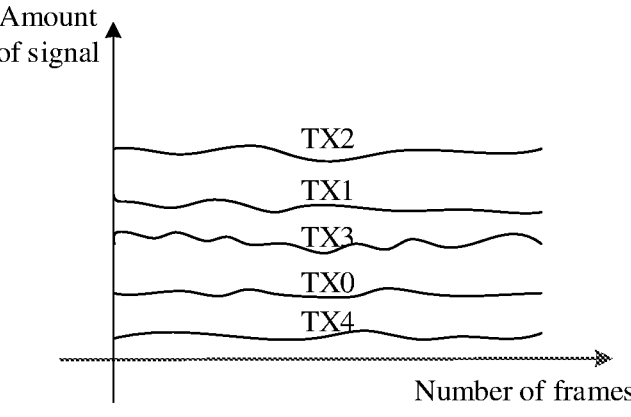
FIG. 7 is a schematic diagram of change of detection data of the Tx channel at different positions in different frames.

In order to ensure stability of the law shown in FIG. 6, as shown in FIG. 7, a plurality of frames may be detected consecutively to obtain respective change of the Tx0 channel to the Tx4 channel with the number of frames, and it can be seen that the detection data of the Tx2 channel always has a largest value.

Taking self-capacitance detection shown in FIG. 2(a) and FIG. 3 as an example, how to determine the folding angle of the foldable screen according to the detection data of the particular detection channel in the present disclosure is described below.

When the folding angle of the foldable screen changes, a distance between two non-bending regions 220 changes, and a coupling capacitor may be formed between detection channels within the two non-bending regions 220, thereby affecting detection data outputted from the detection channels, and interfering with the detection process. Therefore, the folding angle of the foldable screen can be effectively determined according to the detection data of the detection channels. Further, because a large amount of signal is generated on a detection channel at a bending region 210 of the foldable screen, the folding angle of the foldable screen can be determined using the detection data of the detection channel at the bending region 210, thereby improving accuracy of the folding angle detection.

Figure 8:
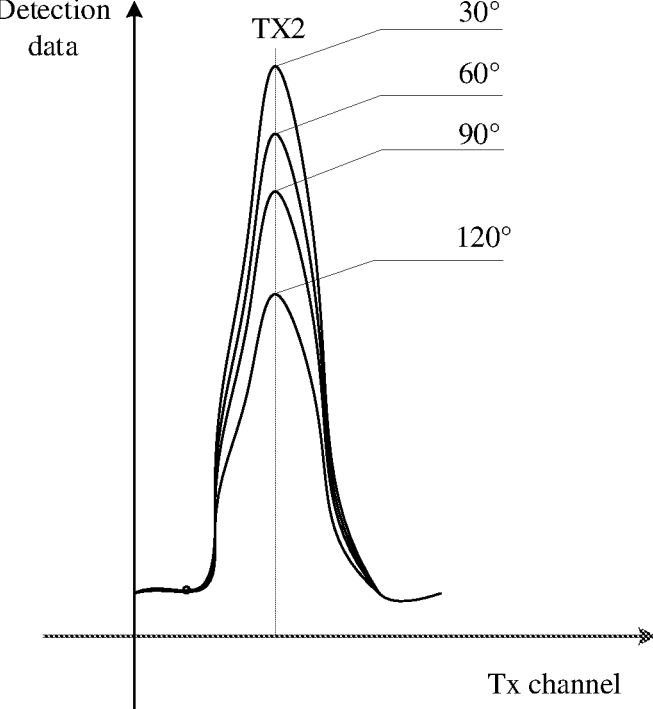
FIG. 8 is a schematic diagram of change of detection data size of a particular detection channel in different folding angles.

As shown in FIG. 8, when the Tx channels are tested, change of the detection data of each Tx channel in different folding angles can be obtained. As can be seen from FIG. 8, the larger the folding angle of the foldable screen is, the larger the value of the detection data of the Tx channel is, especially at the position of the particular detection channel, namely the Tx2 channel. It is understandable that the larger the folding angle of the foldable screen is, the larger the distance between two non-bending regions 220 is, the smaller the coupling capacitance formed between detection channels within the two non-bending regions 220 is, and therefore, the smaller the value of the detection data of the Tx channel is.

Therefore, a change trend of the detection data of the particular detection channel in a folding process can be taken as a characteristic quantity for identifying the folding angle. For example, in step 120, the folding angle of the foldable screen can be determined according to the detection data of the particular detection channel and a function for representing a relationship between the detection data and the folding angle.

In order to reduce influence of environmental factors on the detection process, and further improve accuracy of the folding angle detection, the detection data of the particular detection channel can be processed to obtain a new mapping relationship. For example, in step 120, the determining the folding angle of the foldable screen according to the detection data of the particular detection channel and the function for representing the relationship between the detection data and the folding angle includes: differentiating the detection data of the particular detection channel and detection data of a first detection channel adjacent to the particular detection channel to obtain differential data of the particular detection channel; and determining the folding angle of the foldable screen according to the differential data of the particular detection channel and a function for representing a relationship between the differential data and the folding angle.

The detection data of the particular detection channel and detection data of a detection channel adjacent to the particular detection channel are differentiated to obtain differential data, thereby eliminating environmental interferences, and reducing the influence of the environmental factors on the detection process. In this case, the function specifically represents the relationship between the differential data of the particular detection channel and the folding angle.

Figure 9:
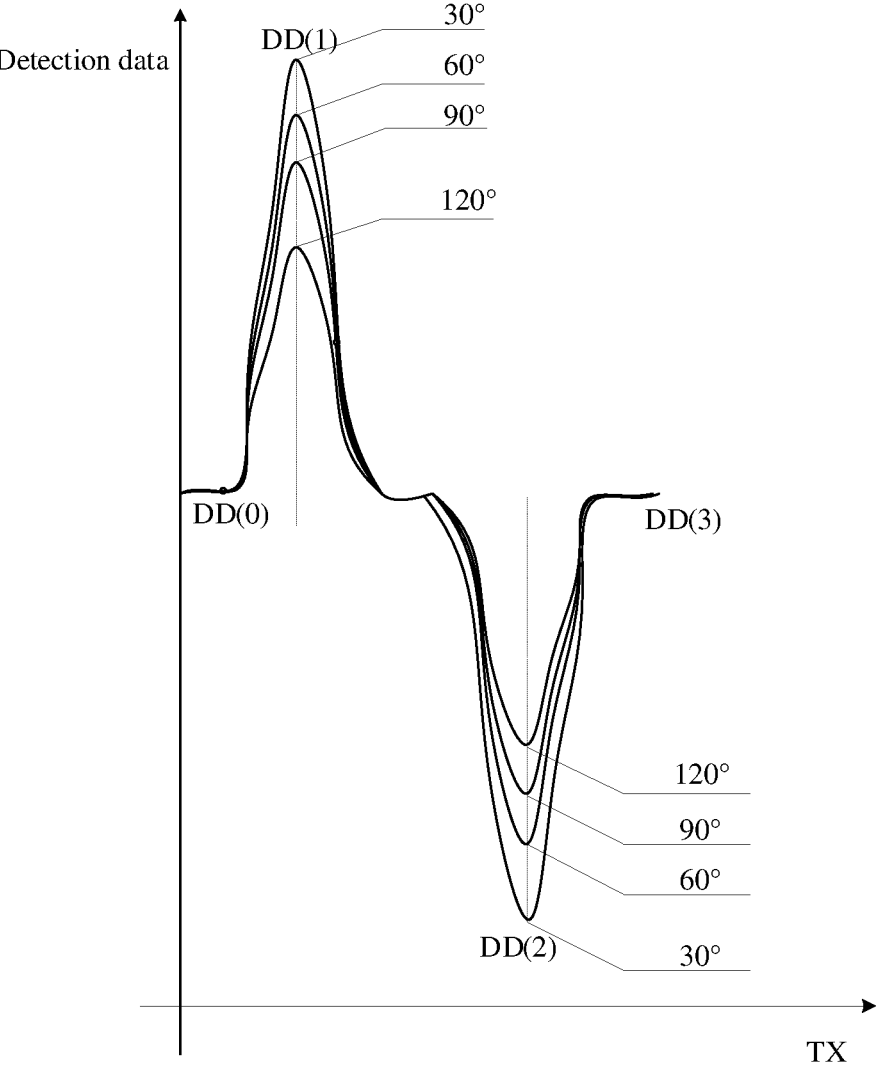
FIG. 9 is a schematic diagram of a relationship between differential data and folding angles.

FIG. 9 shows the relationship between the differential data and the folding angle. Still taking the self-capacitance detection shown in FIG. 2(a) and FIG. 3 as an example, differential data of an (i+1)-th Tx detection channel is denoted as $DD(i)$, $DD(i)=D(i+1)-D(i)$, where $0 \leq i < 4$, and $D(i)$ is a difference value between base data and raw data of an i-th Tx detection channel in a current folding angle, where the base data may be, for example, raw data of the i-th Tx detection channel when the folding angle is 180°. In different folding angles, such as 30°, 60°, 90°, and 120°, differential data of the Tx channels at different positions are obtained respectively, and the relationship between the positions of the Tx channels and values of differential data thereof in the different folding angles shown in FIG. 9 can be obtained.

As can be seen from FIG. 9, in the curves of FIG. 9, symmetrical data characteristics arise with peak values at both DD(1) and DD(2). Therefore, both DD(1) and DD(2) can be used to determine the folding angle of the foldable screen, so as to enhance recognition effects of the folding angle. A function relationship between the folding angle and the differential data can be obtained by, for example, fitting according to differential data of the Tx2 channel in the different folding angles.

The differential data of the Tx2 channel may be differential data DD(1) obtained by subtracting detection data of an adjacent Tx1 channel from the detection data of the Tx2 channel, and accordingly, the function is a function representing a relationship between the DD(1) and the folding angle; or, the differential data of the Tx2 channel may be differential data DD(2) obtained by subtracting the detection data of the Tx2 channel from detection data of an adjacent Tx3 channel, and accordingly, the function is a function representing a relationship between the DD(2) and the folding angle.

In an implementation, the differential data of the particular detection channel includes first differential data and second differential data, where the first differential data is differential data between the detection data of the particular detection channel and detection data of an adjacent first detection channel located on one side of the particular detection channel, and the second differential data is differential data between detection data of an adjacent first detection channel located on the other side of the particular detection channel and the detection data of the particular detection channel. For example, the first differential data may be one of the DD(1) and the DD(2) shown in FIG. 9, and the second differential data may be the other of the DD(1) and the DD(2) shown in FIG. 9. The DD(1) is a difference value between the detection data of the Tx2 channel and the detection data of the adjacent Tx1 channel on its left side, and the DD(2) is a difference value between the detection data of the adjacent Tx3 channel on a right side of the Tx2 channel and the detection data of the Tx2 channel.

In this case, in step 120, a first folding angle may be first determined according to the first differential data and a first function for representing a relationship between the first differential data and the folding angle. If the first folding angle is located within a first preset range, the first folding angle is determined as the folding angle of the foldable screen. If the first folding angle exceeds the first preset range, a second folding angle is determined according to the second differential data and a second function for representing a relationship between the second differential data and the folding angle; and if the second folding angle is located within a second preset range, the second folding angle is determined as the folding angle of the foldable screen.

In this way, even if the folding angle of the foldable screen is not successfully computed using the first differential data, the folding angle can be re-computed using the second differential data, thus improving a success rate of folding angle recognition.

Assuming that the first differential data is the DD(1), and the second differential data is the DD(2), the first function func1 is used to represent the relationship between the first differential data DD(1) and different folding angles, i.e., Angle=func1(DD(1)); and the second function func2 is used to represent the relationship between the DD(2) and different folding angles, i.e., Angle=func2(DD(2)). Considering that there may be differences between different detection channels themselves in practical applications, the position of the DD(i) in FIG. 9 may change in a practical test, so that the first function func1 may be same as, or may be different from, the second function func2.

Figure 10:
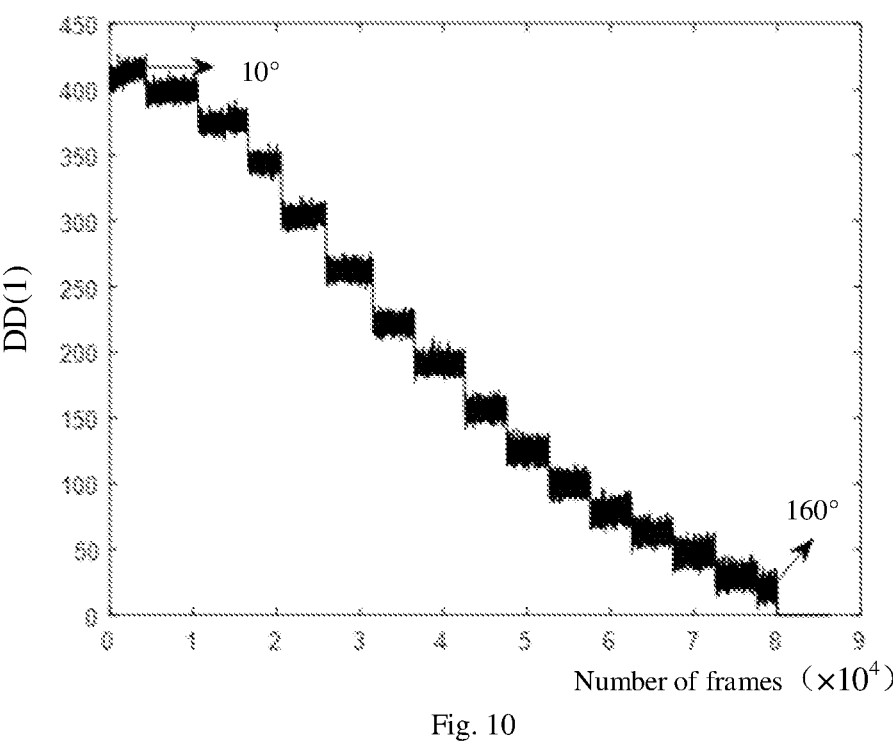
FIG. 10 is a schematic diagram of change of differential data of a particular detection channel in different folding angles.

Taking the DD(1) as an example, FIG. 10 shows change of the DD(1) at the bending region 210 in different folding angles. The folding angle of the foldable screen is gradually changed in a unit of 10°. As an example, the folding angles in FIG. 10 are successively 10°, 20°, 30°, 40°, 50°, 60°, 70°, 80°, 90°, 100°, 110°, 120°, 130°, 140°, 150°, and 160°. When the foldable screen is folded from 10° to 160°, self-capacitance detection is performed for a plurality of consecutive frames. In FIG. 10, the abscissa is the number of frames in the folding process, and the ordinate is the value of the DD(1) of the Tx2 channel.

Figure 11:
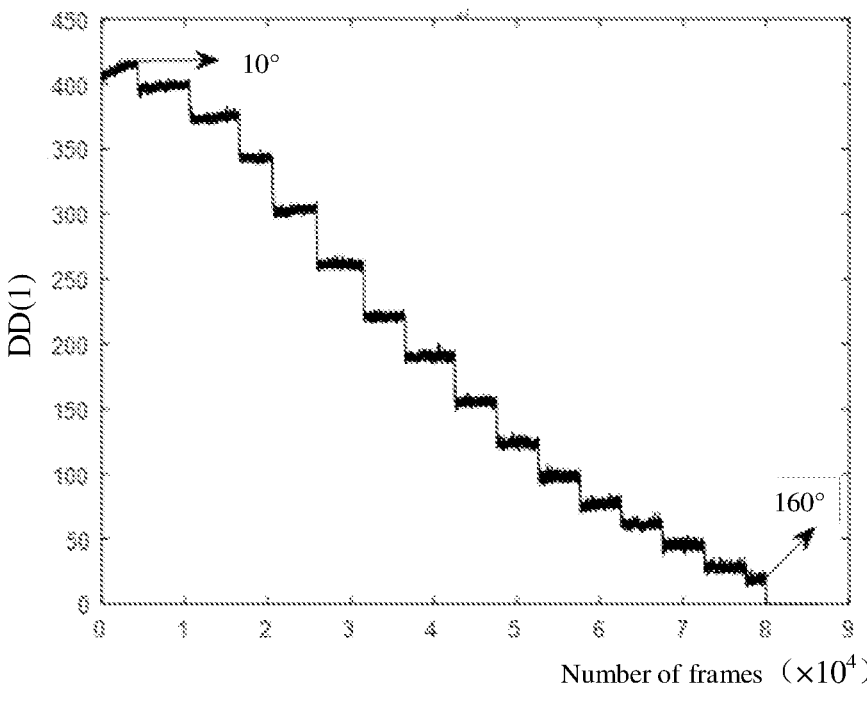
FIG. 11 is a schematic diagram of change of filtered differential data of the particular detection channel in different folding angles.

In order to minimize the effects caused by noise dither, filtering, such as moving average filtering, is performed on data collected in each frame in FIG. 10, thus obtaining FIG. 11.

Figure 12:
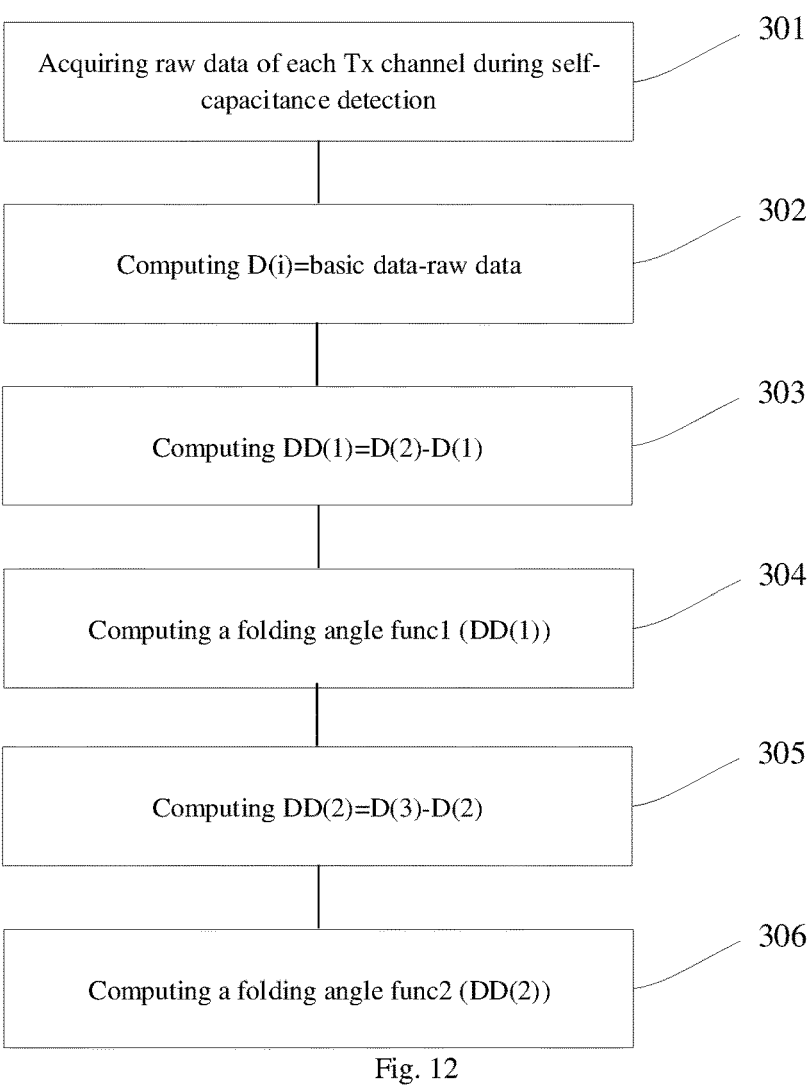
FIG. 12 is a schematic diagram of a possible specific process of folding angle detection in the present disclosure.

Based on FIG. 11, the fund can be computed. In a similar way, the func2 can be obtained. Taking the self-capacitance detection shown in FIG. 2(*a*) as an example, during the folding angle detection, as shown in FIG. 12, step 301: acquiring raw data of each Tx channel during self-capacitance detection;

Step 302: subtracting raw data of the Tx channel from base data to obtain detection data D(i) of the Tx channel;

Step 303: subtracting detection data D(1) of a Tx1 channel from detection data D(2) of a Tx2 channel to obtain first differential data DD(1)=D(2)−D(1); and Step 304: substituting the first differential data DD(1) into a first function func1 to obtain a first folding angle fund (DD(1)).

If the first folding angle fund (DD(1)) is located within a first preset range, the first folding angle is regarded as a current folding angle of the foldable screen; and if the first folding angle fund 1 (DD(1)) exceeds the first preset range, optionally, the following steps can be performed:

Step 305: subtracting the detection data D(2) of the Tx2 channel from detection data D(3) of a Tx3 channel to obtain second differential data DD(2)=D(3)−D(2); and Step 306: substituting the second differential data DD(2) into a second function func2 to obtain a second folding angle func2 (DD(2)).

If the second folding angle func2 (DD(2)) is located within a second preset range, the second folding angle is regarded as a current folding angle of the foldable screen.

The first preset range and the second preset range are a permissible range of the DD(1) and a permissible range of the DD(2), respectively. Current detection data, if exceeding the ranges, can be regarded as inaccurate, and the resulting folding angle cannot be acceptable. The first preset range may, or may not be, equal to the second preset range.

It should be understood that data outputted from the particular detection channel during mutual capacitance detection and cross detection can also be used to determine the folding angle after processing similar to the processing of the data outputted from the particular detection channel during the above self-capacitance detection. For the sake of brevity, the details are not repeated here.

Figure 13:
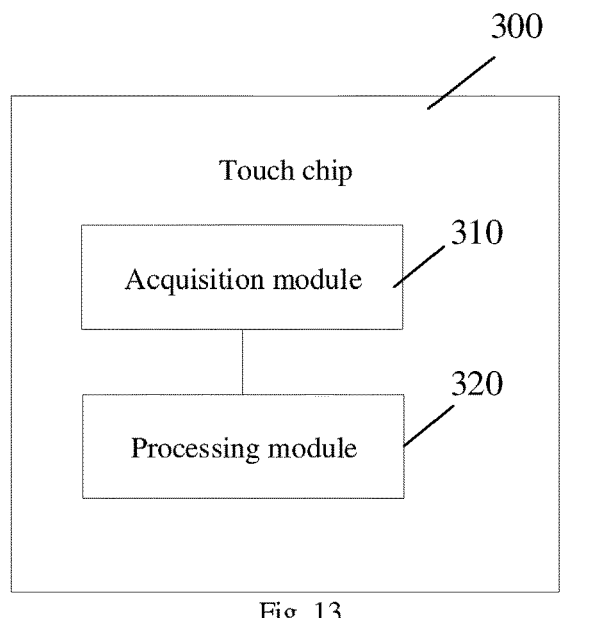
FIG. 13 is a schematic block diagram of an apparatus for detecting a folding angle in an embodiment of the present disclosure.

An embodiment of the present disclosure further provides a touch chip. As shown in FIG. 13, the touch chip 300 is configured to detect a folding angle of a foldable screen of an electronic device. The touch chip 300 includes:

an acquisition module 310 configured to acquire detection data of a particular detection channel in a touch panel 200, where the touch panel 200 includes a bending region extending along a first direction X and a non-bending region distributed on both sides of the bending region along a second direction Y, the second direction Y is perpendicular to the first direction X, and the particular detection channel is a first detection channel that is closest to the bending region or is located within the bending region among a plurality of first detection channels parallel to the first direction X; and a processing module 320 configured to determine the folding angle of the foldable screen according to the detection data of the particular detection channel. The detection data of the particular detection channel is self-capacitance detection data output from the particular detection channel, the self-capacitance detection data being data of a sensing signal output from the particular detection channel when a drive signal is input to the particular detection channel.

In an implementation, among the plurality of first detection channels, detection data of the first detection channel that is closest to the bending region or is located within the bending region is greater than detection data of other first detection channels.

In an implementation, the first detection channel that is closest to the bending region or is located within the bending region includes a channel that is located in the middle of the foldable screen and a channel adjacent to the channel that located in the middle of the foldable screen.

In an implementation, the processing module 320 is configured to determine the folding angle of the foldable screen based on a difference value between base data and raw data output from the particular detection channel. The base data is raw data output from the particular detection channel when the folding angle is a preset angle. The preset angle is 180°.

In an implementation, the processing module 320 is configured to perform a weighted average of a plurality of said difference value.

In an implementation, the particular detection channels is provided as 6, 8 or 10 in number.

In an implementation, the processing module 320 is specifically configured to: determine the folding angle of the foldable screen according to the detection data of the particular detection channel and a function for representing a relationship between the detection data and the folding angle.

In an implementation, the processing module 320 is specifically configured to: differentiate the detection data of the particular detection channel and detection data of a first detection channel adjacent to the particular detection channel to obtain differential data of the particular detection channel; and determine the folding angle of the foldable screen according to the differential data of the particular detection channel and a function for representing a relationship between the differential data and the folding angle.

In an implementation, the differential data of the particular detection channel includes first differential data and second differential data, where the first differential data is differential data between the particular detection channel and an adjacent first detection channel located on one side of the particular detection channel, and the second differential data is differential data between an adjacent first detection channel located on the other side of the particular detection channel and the particular detection channel; and the processing module 320 is specifically configured to: determine a first folding angle according to the first differential data and a first function for representing a relationship between the first differential data and the folding angle; determine, in response to the first folding angle exceeding a first preset range, a second folding angle according to the second differential data and a second function for representing a relationship between the second differential data and the folding angle; and determine, in response to the second folding angle being located within a second preset range, the second folding angle as the folding angle of the foldable screen.

In an implementation, the processing module 320 is further configured to: determine, in response to the first folding angle being located within the first preset range, the first folding angle as the folding angle of the foldable screen.

In an implementation, the detection data of the particular detection channel is determined according to a difference value between base data and raw data outputted from the particular detection channel, and the base data is raw data outputted from the particular detection channel when the folding angle is a preset angle. The preset angle is, for example, 180°.

In an implementation, the detection data of the particular detection channel is a difference value between the base data and raw data outputted from the particular detection channel when a drive signal is inputted into the particular detection channel.

In an implementation, the detection data of the particular detection channel is determined according to the base data and a plurality of raw data outputted from the particular detection channel respectively when a drive signal is successively inputted into a plurality of second detection channels parallel to the second direction Y.

In an implementation, the detection data of the particular detection channel is a sum of difference values between the base data and the plurality of raw data respectively.

In an implementation, the detection data of the particular detection channel is a difference value between the base data and data outputted from the particular detection channel when a drive signal is inputted into the plurality of second detection channels parallel to the second direction Y simultaneously.

It should be understood that relevant descriptions in the above method embodiments may be referred to for specific features and corresponding beneficial effects of the touch chip 300, which are not repeated here for the sake of brevity.

The present disclosure further provides a touch panel, where the touch panel includes: a plurality of first detection channels parallel to a first direction; a plurality of second detection channels parallel to a second direction, where the second direction is perpendicular to the first direction; and the touch chip 300 according to any one of the above embodiments.

The present disclosure further provides an electronic device, including a foldable screen and the touch panel according to any one of the above embodiments, where the touch panel is configured to detect a folding angle of the foldable screen.

As an example and non-restrictively, the electronic device in an embodiment of the present disclosure may be a portable or mobile computing device, such as a terminal device, a mobile phone, a tablet computer, a notebook computer, a desktop computer, a game device, a vehicle electronic device, or a wearable smart device, or may be other electronic devices, such as an electronic database, an automobile, or an automated teller machine (ATM) of a bank. The wearable smart device includes a device that has full functions and a large size, and can realize complete or partial functions without relying on a smart phone, such as a smart watch or smart glasses, and includes a device that only focuses on a certain type of application functions and needs to be used in cooperation with other devices such as a smart phone, for example, various smart bracelets and smart jewelries for monitoring physical signs.

It should be noted that the embodiments in the present disclosure and/or the technical features in the embodiments may be randomly combined with each other on a non-conflict basis, and the combined technical solutions should also fall into the scope of protection of the present disclosure.

The system, apparatus, and method disclosed in the embodiments of the present disclosure may be implemented by other approaches. For example, some features of the method embodiments described above may be neglected, or may not be performed. The above described apparatus embodiments are merely illustrative, the division of the units is only a logical function division, other division manners may be available during actual implementations, and a plurality of units or components may be combined or may be integrated into another system. In addition, the coupling between the units or the coupling between the components may be direct coupling or indirect coupling, and the above coupling includes electrical, mechanical, or other forms of connection.

Those skilled in the art can clearly understand that, for convenience and simplicity of description, corresponding processes and technical effects in the above method embodiments may be referred to for specific working process of the above described apparatus and device and technical effects thereof, which will not be repeated here.

It should be understood that the specific examples in the embodiments of the present disclosure are provided only to help those skilled in the art to better understand the embodiments of the present disclosure, rather than limiting the scope of the embodiments of the present disclosure. Those skilled in the art may make various improvements and modifications on the basis of the above embodiments, and these improvements or modifications all fall within the scope of protection of the present disclosure.

While the above description merely provides specific embodiments of the present disclosure, the scope of protection of the present disclosure is not limited to the specific embodiments. Any person skilled in the present technical field can easily conceive of alterations or replacements within the technical scope disclosed in the present disclosure. All these alterations or replacements should be encompassed within the scope of protection of the present disclosure. Therefore, the scope of protection of the present disclosure should be determined by the scope of protection of the appended claims.

What is claimed is:

1. A method for detecting a folding angle of a foldable screen, comprising:

acquiring detection data of a particular detection channel in a touch panel, wherein the touch panel comprises a bending region extending along a first direction and a non-bending region distributed on both sides of the bending region along a second direction, the second direction is perpendicular to the first direction, and the particular detection channel comprises a first detection channel that is closest to the bending region or is located within the bending region among a plurality of first detection channels parallel to the first direction; and determining the folding angle of the foldable screen according to the detection data of the particular detection channel, wherein the detection data of the particular detection channel is self-capacitance detection data output from the particular detection channel, the self-capacitance detection data being data of a sensing signal output from the particular detection channel when a drive signal is input to the particular detection channel, wherein the determining the folding angle of the foldable screen according to the detection data of the particular detection channel comprises:

determining the folding angle of the foldable screen according to the detection data of the particular detection channel and a function for representing a relationship between the detection data and the folding angle, wherein the determining the folding angle of the foldable screen according to the detection data of the particular detection channel and the function for representing the relationship between the detection data and the folding angle comprises:

differentiating the detection data of the particular detection channel and detection data of a first detection channel adjacent to the particular detection channel to obtain differential data of the particular detection channel; and determining the folding angle of the foldable screen according to the differential data of the particular detection channel and a function for representing a relationship between the differential data and the folding angle.

2. The method according to claim 1, wherein the determining the folding angle of the foldable screen according to the detection data of the particular detection channel comprises:

among the plurality of first detection channels, detection data of the first detection channel that is closest to the bending region or is located within the bending region is greater than detection data of other first detection channels.

3. The method according to claim 1, wherein the first detection channel that is closest to the bending region or is located within the bending region comprises a channel that is located in the middle of the foldable screen and a channel adjacent to the channel that located in the middle of the foldable screen.

4. The method according to claim 1, wherein the determining the folding angle of the foldable screen according to the detection data of the particular detection channel comprises:

determining the folding angle of the foldable screen based on at least one difference value between base data and raw data output from the particular detection channel, the base data is raw data output from the particular detection channel when the folding angle is a preset angle.

5. The method according to claim 4, wherein the preset angle is 180°.

6. The method according to claim 4, wherein the at least one difference value between base data and raw data output from the particular detection channel is a plurality of difference values, the method further comprising:

performing a weighted average of the plurality of the difference values.

7. The method according to claim 1, wherein the particular detection channel is provided as 6, 8 or 10 in number.

8. The method according to claim 1, wherein the differential data of the particular detection channel comprises first differential data and second differential data, wherein the first differential data is differential data between the particular detection channel and an adjacent first detection channel located on one side of the particular detection channel, and the second differential data is differential data between an adjacent first detection channel located on the other side of the particular detection channel and the particular detection channel; and the determining the folding angle of the foldable screen according to the differential data of the particular detection channel and the function for representing the relationship between the differential data and the folding angle comprises:

determining a first folding angle according to the first differential data and a first function for representing a relationship between the first differential data and the folding angle;

determining, in response to the first folding angle exceeding a first preset range, a second folding angle according to the second differential data and a second function for representing a relationship between the second differential data and the folding angle; and determining, in response to the second folding angle being located within a second preset range, the second folding angle as the folding angle of the foldable screen.

9. A touch chip, being configured to detect a folding angle of a foldable screen of an electronic device, and comprising:

an acquisition module configured to acquire detection data of a particular detection channel in a touch panel, wherein the touch panel comprises a bending region extending along a first direction and a non-bending region distributed on both sides of the bending region along a second direction, the second direction is perpendicular to the first direction, and the particular detection channel comprises a first detection channel that is closest to the bending region or is located within the bending region among a plurality of first detection channels parallel to the first direction; and a processing module configured to differentiate the detection data of the particular detection channel and detection data of a first detection channel adjacent to the particular detection channel to obtain differential data of the particular detection channel; and determine the folding angle of the foldable screen according to the differential data of the particular detection channel and a function for representing a relationship between the differential data and the folding angle, wherein the detection data of the particular detection channel is self-capacitance detection data output from the particular detection channel, the self-capacitance detection data being data of a sensing signal output from the particular detection channel when a drive signal is input to the particular detection channel.

10. The touch chip according to claim 9, wherein among the plurality of first detection channels, detection data of the first detection channel that is closest to the bending region or is located within the bending region is greater than detection data of other first detection channels.

11. The touch chip according to claim 9, wherein the first detection channel that is closest to the bending region or is located within the bending region comprises a channel that is located in the middle of the foldable screen and a channel adjacent to the channel that located in the middle of the foldable screen.

12. The touch chip according to claim 9, wherein the first detection channel that is closest to the bending region or is located within the bending region comprises a channel that is located in the middle of the foldable screen and a channel adjacent to the channel that located in the middle of the foldable screen;

the processing module is configured to:

determine the folding angle of the foldable screen based on at least one difference value between base data and raw data output from the particular detection channel, the base data is raw data output from the particular detection channel when the folding angle is a preset angle, wherein the preset angle is 180°.

13. The touch chip according to claim 12, wherein the at least one difference value between base data and raw data output from the particular detection channel is a plurality of difference values, the processing module is configured to perform a weighted average of the plurality of the difference values.

14. The touch chip according to claim 9, wherein the particular detection channel is provided as 6, 8 or 10 in number.

15. The touch chip according to claim 9, wherein the differential data of the particular detection channel comprises first differential data and second differential data, wherein the first differential data is differential data between the particular detection channel and an adjacent first detection channel located on one side of the particular detection channel, and the second differential data is differential data between an adjacent first detection channel located on the other side of the particular detection channel and the particular detection channel;

the processing module is configured to:

determine a first folding angle according to the first differential data and a first function for representing a relationship between the first differential data and the folding angle;

determine, in response to the first folding angle exceeding a first preset range, a second folding angle according to the second differential data and a second function for representing a relationship between the second differential data and the folding angle; and determine, in response to the second folding angle being located within a second preset range, the second folding angle as the folding angle of the foldable screen.

16. An electronic device, comprising: a foldable screen; and the touch chip according to claim 11, the touch chip being configured to detect a folding angle of the foldable screen.

\* \* \* \* \*